US010015459B2

(12) United States Patent
Huang et al.

(10) Patent No.: US 10,015,459 B2
(45) Date of Patent: Jul. 3, 2018

(54) IMAGE CAPTURING DEVICE WITH AUTOMATIC WHITE BALANCE AND AUTOMATIC WHITE BALANCE CORRECTION METHOD

(71) Applicant: AVer Information Inc., New Taipei (TW)

(72) Inventors: Kuo-Hao Huang, New Taipei (TW); Hao-Shuo Hsu, New Taipei (TW); Chung-Yi Kao, New Taipei (TW)

(73) Assignee: AVER INFORMATION INC., New Taipei (TW)

( * ) Notice: Subject to any disclaimer, the term of this patent is extended or adjusted under 35 U.S.C. 154(b) by 21 days.

(21) Appl. No.: 15/158,328

(22) Filed: May 18, 2016

(65) Prior Publication Data

US 2017/0272721 A1 Sep. 21, 2017

(30) Foreign Application Priority Data

Mar. 18, 2016 (TW) ............................ 105108439 A

(51) Int. Cl.
*H04N 9/73* (2006.01)
*H04N 1/60* (2006.01)

(52) U.S. Cl.
CPC ........... *H04N 9/735* (2013.01); *H04N 1/6027* (2013.01)

(58) Field of Classification Search
CPC ..... H04N 9/735; H04N 1/6027; H04N 1/6077
USPC ............................... 348/223.1, 224.1, 225.1
See application file for complete search history.

(56) References Cited

U.S. PATENT DOCUMENTS 5,659,357 A 8/1997 Miyano
6,094,539 A * 7/2000 Abe .................. H04N 1/00249 348/E9.052
7,701,489 B1 * 4/2010 Christie .................. G03B 7/00 348/223.1
9,361,495 B2 * 6/2016 Nunnink ............ G06K 7/10742
9,407,833 B2 * 8/2016 Cossairt .................. G06T 5/003
(Continued)

FOREIGN PATENT DOCUMENTS

CN 100477806 C 4/2009
TW 201523515 A 6/2015

OTHER PUBLICATIONS

Office Action with Search Report issued by TIPO dated Jul. 1, 2017.

*Primary Examiner* — Albert Cutler
(74) *Attorney, Agent, or Firm* — Nixon Peabody LLP

(57) ABSTRACT

An image capturing device with automatic white balance and an automatic white balance correction method are provided. The image capturing device includes a lens assembly, a light diffuser, an image sensor and a processor. The relative position of the light diffuser and the lens assembly is fixed. The processor is electrically connected to the image sensor having a first sensing region and a second sensing region. The light diffuser converts a fraction of the incident light to the reference light. The first sensing region converts the incident light to the display image information. The second sensing region converts the reference light to the correction information. The processor determines a reference gain average according to at least one color gain of the correction information and obtains at least one color gain correction value according to the reference gain average to adjust the white balance setting of the display image information.

5 Claims, 13 Drawing Sheets

(56) References Cited

U.S. PATENT DOCUMENTS

| | | | | |
|---|---|---|---|---|
| 2003/0160877 | A1* | 8/2003 | Sumida | H04N 17/002 348/223.1 |
| 2004/0125215 | A1* | 7/2004 | Wallace | H04N 5/2254 348/223.1 |
| 2006/0152610 | A1* | 7/2006 | Voronov | H04N 5/2251 348/294 |
| 2009/0002545 | A1* | 1/2009 | Heinonen | H04N 5/2253 348/370 |
| 2015/0281665 | A1* | 10/2015 | Wu | H04N 9/735 348/224.1 |
| 2016/0255321 | A1* | 9/2016 | Chen | H04N 9/735 348/223.1 |

* cited by examiner

IMAGE CAPTURING DEVICE WITH AUTOMATIC WHITE BALANCE AND AUTOMATIC WHITE BALANCE CORRECTION METHOD

CROSS-REFERENCE TO RELATED APPLICATIONS

This non-provisional application claims priority under 35 U.S.C. § 119(a) to Patent Application No(s). 105108439 filed in Taiwan, R.O.C. on Mar. 18, 2016, the entire contents of which are hereby incorporated by reference.

BACKGROUND

Technical Field

The disclosure relates to an image capturing device having automatic white balance, and an automatic white balance correction method, more particularly to an image capturing device having automatic white balance and a light diffuser, and an automatic white balance correction method.

Related Art

When a camera or a video camera is working, a photographic image may have a color cast, such as a red color cast or a blue color cast, because of the color temperature of ambient light. Therefore, white balance is usually used to process raw images generated by the camera or the video camera, to remove the color cast caused by the color temperature of the light source.

One way to set white balance is dividing a photographic image into many blocks and then analyzing the regional color temperature of each of the blocks to correct the white balance setting of the entire image using a variety of algorithms. However, this method requires a great deal of computing resources and has a relatively-low correction accuracy that is resulted from the slight difference between the color gains of different colors under different color temperatures. Also, this method will not work when none of the color gain correction values obtained in the analysis corresponds to a preset color temperature.

Another way to set white balance is using a white balance lens cap to correct the white balance setting. However, this method cannot immediately correct the white balance setting and meanwhile, capture an image. Moreover, a user needs to manually attach or detach the white balance lens cap. Therefore, it is impossible for this method to accurately correct the current white balance setting, and even this method inconvenience the user.

SUMMARY

Therefore, the disclosure provides an image capturing device having automatic white balance, and an automatic white balance correction method to resolve the foregoing problems, such as the demand for a great deal of computing resources during correcting the white balance setting, the possibility of immediately correcting the white balance setting during photographing, and the requirement of detaching the relevant members.

According to an embodiment, an image capturing device having automatic white balance includes a lens assembly, a light diffuser, an image sensor and a processor. The relative location of the light diffuser and the lens assembly is fixed. The processor is electrically connected to the image sensor. The light diffuser converts a fraction of the incident light to the reference light. The image sensor has a first sensing region and a second sensing region. The first sensing region converts the incident light to the display image information. The second sensing region converts the reference light to the correction information. The processor analyzes the color components related to at least one pixel in the correction information to obtain a plurality of color gains, determines at least one reference gain average according to the color gains, obtains at least one color gain correction value according to the at least one reference gain average, and adjusts the white balance setting of the display image information according to the at least one color gain correction value.

According to an embodiment, an automatic white balance correction method applied to an image capturing device, which includes a lens assembly, a light diffuser and an image sensor, includes the following steps. The relative location of the light diffuser and the lens assembly is fixed. First, the light diffuser is used to convert a fraction of the incident light to the reference light, a first sensing region of the image sensor is used to convert the incident light to the display image information, and a second sensing region of the image sensor is used to convert the reference light to the correction information. Then, a plurality of color gains is obtained by analyzing the color components related to at least one pixel in the correction information. Next, at least one reference gain average is determined according to the color gains. Moreover, at least one color gain correction value is obtained according to the at least one reference gain average. Finally, the white balance setting of the display image information is adjusted according to the at least one color gain correction value.

As set forth above, the disclosure provides the above image capturing device having automatic white balance, and the above automatic white balance correction method to capture the display image information via the first sensing region of the image sensor and meanwhile, capture the correction information related to one or more diffuser sheets via the second sensing region of the image sensor. Then, the relevant information of the current color temperature or the information about the correction of the white balance setting is determined according to the correction information to correct the white balance information of display images. Therefore, the disclosure may occupy a relatively low quantity of computing resources and not interfere with photographing.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
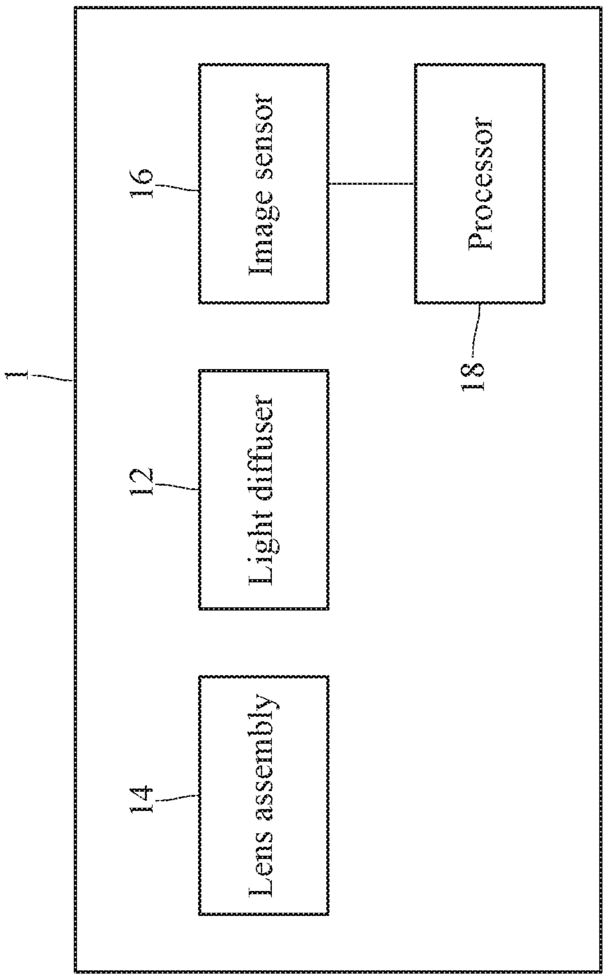
FIG. 1 is a block diagram of an image capturing device having white balance according to an embodiment of the disclosure.
Figure 2A:
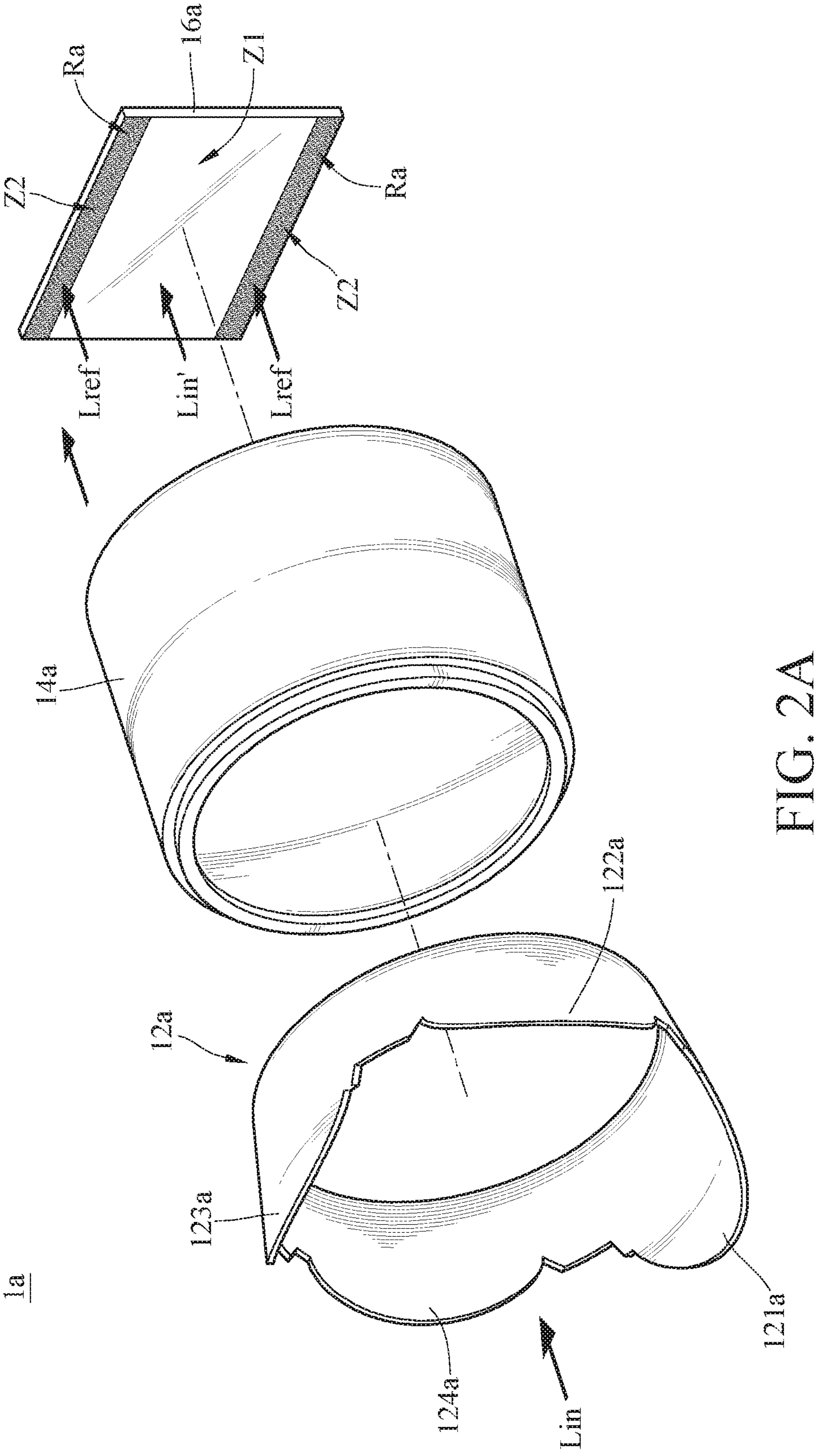
FIG. 2A is a schematic view of the relative location of a fraction of components in the image capturing device according to the first embodiment of the disclosure.

Please refer to FIG. 1 and FIG. 2A, FIG. 1 is a block diagram of an image capturing device having white balance according to an embodiment of the disclosure, and FIG. 2A is a schematic view of the relative location of a fraction of components in the image capturing device according to the first embodiment of the disclosure. An image capturing device 1 having automatic white balance (referred to as image capturing device hereinafter) includes a lens assembly 14, a light diffuser 12, an image sensor 16 and a processor 18. The relative location of the light diffuser 12 and the lens assembly 14 is fixed. The processor 18 is electrically connected to the image sensor 16.

The lens assembly 14 is a variety of lenses, such as a zoom lens or prime lens or a normal lens or wide-angle lens of the zoom lens or prime lens. Embodiments based on different types of the lens assembly 14 will be described later.

The light diffuser 12 converts a fraction of the incident light Lin to the reference light Lref. In an embodiment, the light diffuser 12 is, for example, made up of a single diffuser sheet or multiple diffuser sheets. In another embodiment, the light diffuser 12 is, for example, a lens hood having the material or structure of diffuser sheet. That is, in this embodiment, the appearance of the light diffuser 12 is like a lens hood and thus, has a function similar to that of a lens hood, and the material and structure of the light diffuser 12 lead to a function similar to that of a diffuser sheet. On the other hand, the light diffuser 12 is detachablely disposed between the lens assembly 14 and an object/scene to be photographed or between the lens assembly 14 and the image sensor 16. The disclosure is not limited to how the light diffuser 12 is disposed in the image capturing device 1, and any means of letting the image sensor 16 sense the light or image propagating from the light diffuser 12 falls in the scope of the disclosure.

In this embodiment, as shown in FIG. 2A, the light diffuser 12*a* is located between the lens assembly 14*a* and an object to be photographed. This object to be photographed can be any type. Any person having ordinary skill in the art can understand the relationship between this object to be photographed and the image capturing device 1*a* during photographing, and the relationship is not repeatedly described hereinafter. Moreover, the main propagating direction of the incident light Lin, the main propagating direction of the incident light Lin' and the main propagating direction of the reference light Lref are concisely represented by the bold arrow in FIG. 2A. However, in practice, the incident light Lin and Lin' and the reference light Lref may propagate in various directions based on a variety of light sources, and the disclosure is not limited to these exemplary propagating directions.

In the embodiment shown in FIG. 2A, approximately, the incident light Lin propagates to the image sensor 16*a* after propagating to the light diffuser 12*a* and then the lens assembly 14*a*. When the incident light Lin propagates to the light diffuser 12*a*, a fraction of the incident light Lin is converted to the reference light Lref, so the image sensor 16*a* will receive the reference light Lref and the other fraction of the incident light Lin, which is not absorbed by the light diffuser 12*a*. For a convenient description, a fraction of the incident light Lin, which is not absorbed by the light diffuser 12*a* and propagates to the image sensor 16*a* through the lens assembly 14*a*, is defined as the incident light Lin'.

The image sensor 16*a* includes a first sensing region Z1 and a second sensing region Z2. In an embodiment, the aspect ratio of the valid sensing region of the image sensor 16*a* is different from that of an image issued by the image sensor 16*a*, so during imaging, only a fraction of the light sensed by the valid sensing region is converted to an image. In another embodiment, the lens assembly 14*a* is, for example, a wide-angle lens leading to distorted images, so in general, lens distortion correction (LDC) is used to calibrate images. During calibration, only a fraction of the valid sensing region of the image sensor 16*a* is usually used to generate images, and this fraction is defined as the first sensing region Z1 as the rest of the valid sensing region of the image sensor 16*a* is defined as the second sensing region Z2. For example, the image sensor 16*a* is not limited to a complementary metal-oxide semiconductor (CMOS) or charge coupled device (CCD) sensor.

The incident light Lin' is absorbed by the first sensing region Z1 to form a display image of an object, and the reference light Lref is absorbed by the second sensing region Z2 to form a reference image Ra related to the light diffuser 12*a*. In the embodiment shown in FIG. 2A, the display image is approximately located at the center of the field of view of the image sensor 16*a* or the lens assembly 14*a*, and the reference image is located at the periphery of the field of view. Specifically, the first sensing region Z1 is used to convert the incident light Lin' to the information about the display image (referred to as display image information); and the second sensing region Z2 is used to convert the reference light Lref to the information about the reference image Ra (referred to as correction information).

The display image information includes color component values of at least a part of the pixels in the first sensing region Z1, and the correction information includes color component values of at least a part of the pixels in the second sensing region Z2. For example, the display image information is one or more images of an object, which are issued from the incident light Lin, or any information about one or more images of the object. For example, the correction information is one or more images issued from the reference light Lin, or any information about the image.

On the other hand, in the embodiment shown in FIG. 2A, the light diffuser 12*a* includes protrusions 121*a*~124*a*, whose shapes are related to the size and shape of the reference image Ra. The reference image Ra may occupy the whole or a part of the second sensing region Z2. The disclosure is not limited to the shape and quantity of the protrusion.

The processor 18 analyzes the color components related to at least one pixel in the correction information to obtain a plurality of color gains, and determines at least one reference gain average according to the color gains. Then, the processor 18 obtains at least one color gain correction value according to the at least one reference gain average and adjusts the white balance setting in the display image information according to the at least one color gain correction value. The detailed operation of the processor 18 will be described later.

In addition, the shape of the light diffuser or the relative position of the light diffuser and the lens assembly will affect the area of the second sensing region, occupied by the reference image, and the shape of the area. Please refer to FIGS. 2B~2E to illustrate the relationship between a reference image and a light diffuser; and FIG. 2B is a schematic view of the relative location of a fraction of components in the image capturing device according to the second embodiment of the disclosure, FIG. 2C is a schematic view of the relative location of a fraction of components in the image capturing device according to the third embodiment of the disclosure, FIG. 2D is a schematic view of the relative location of a fraction of components in the image capturing device according to the fourth embodiment of the disclosure, and FIG. 2E is a schematic view of the relative location of a fraction of components in the image capturing device according to the fifth embodiment of the disclosure.

Figure 2B:
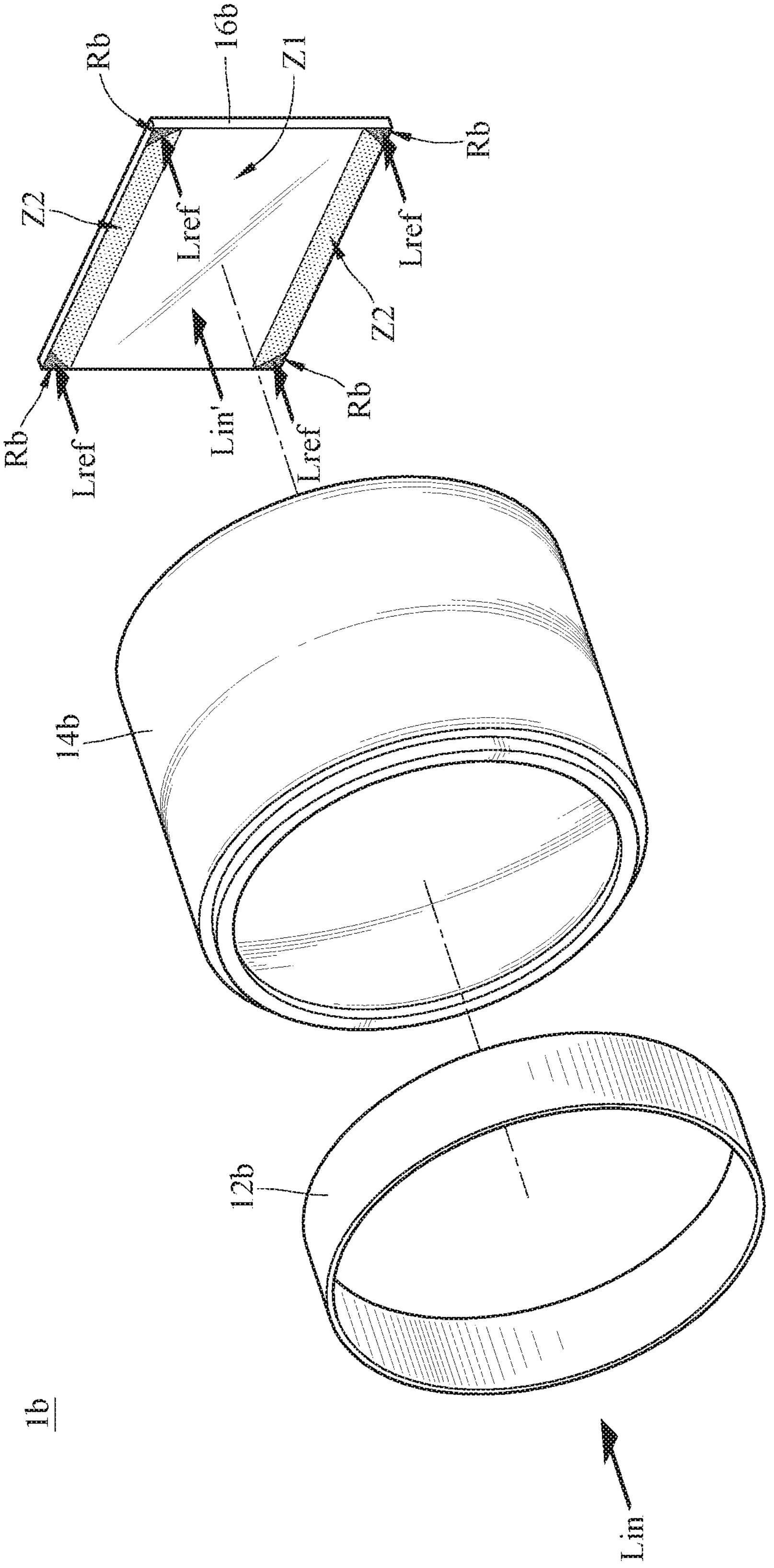
FIG. 2B is a schematic view of the relative location of a fraction of components in the image capturing device according to the second embodiment of the disclosure.

As shown in FIG. 2B, the light diffuser 12*b* is located between an object and the lens assembly 14*b*, the light diffuser 12*b* is ring-shaped, and the reference image Rb is located at a corner of the second sensing region Z2.

Figure 2C:
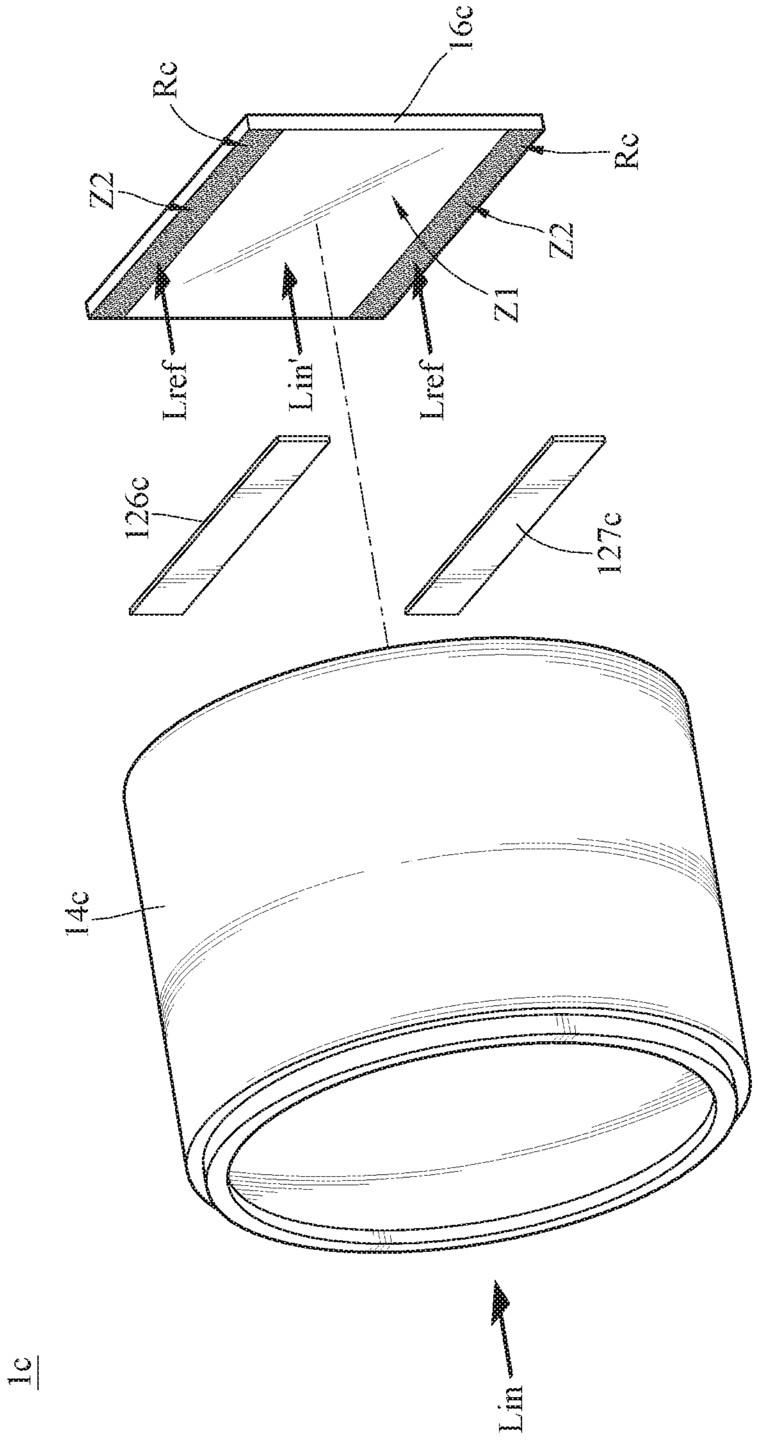
FIG. 2C is a schematic view of the relative location of a fraction of components in the image capturing device according to the third embodiment of the disclosure.

As shown in FIG. 2C, the light diffuser 12*c* is located between the image sensor 16*c* and the lens assembly 14*c* and has a first diffusion part 126*c* and a second diffusion part 127*c*, which are a predetermined distance apart. In this embodiment, the first diffusion part 126*c* and the second diffusion part 127*c* are rectangle-shaped, so the reference image Rc is also rectangle-shaped. The disclosure is not limited to the shape of the first diffusion part 126*c* and the shape of the second diffusion part 127*c* and neither limited to whether the first diffusion part 126*c* and the second diffusion part 127*c* have the same shape.

Figure 2D:
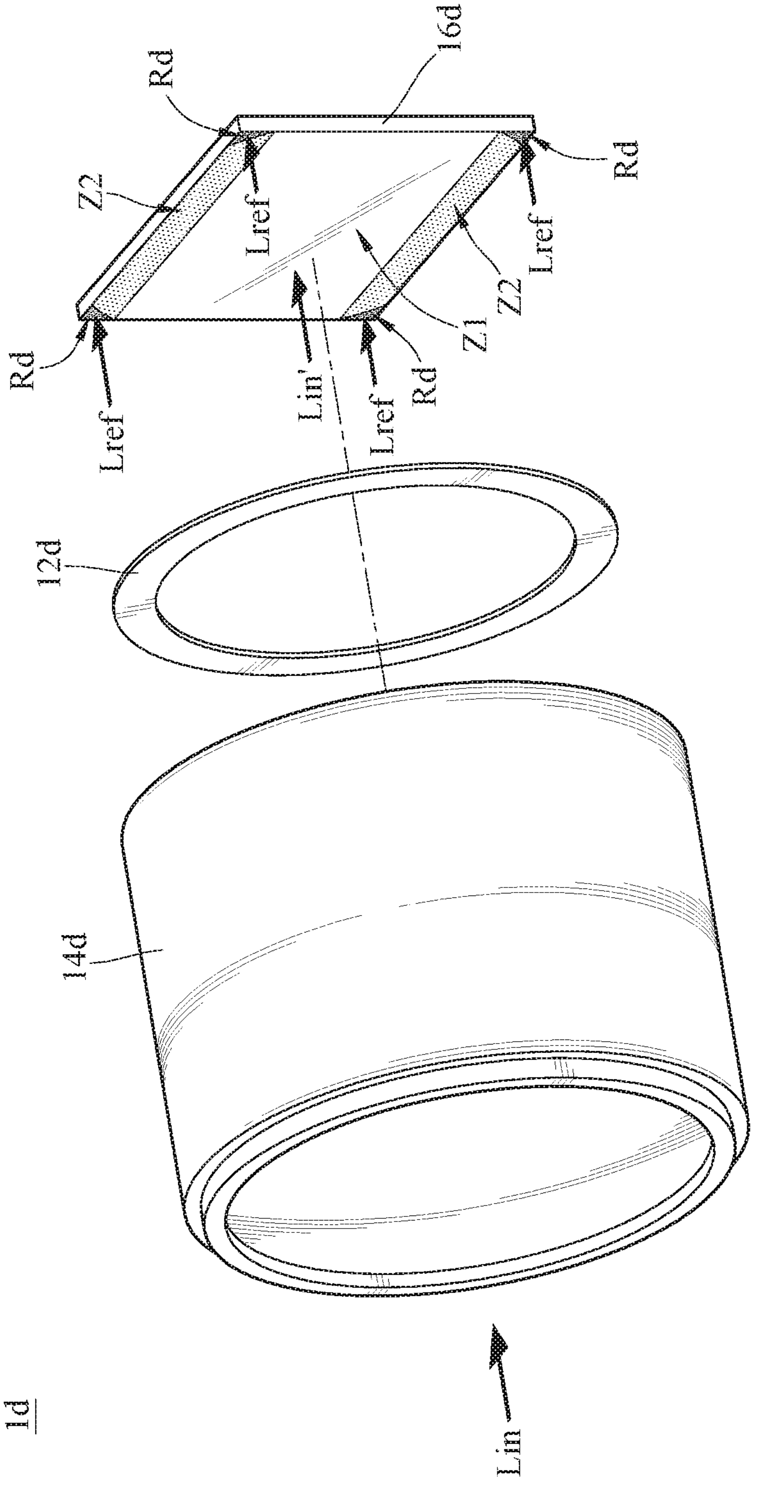
FIG. 2D is a schematic view of the relative location of a fraction of components in the image capturing device according to the fourth embodiment of the disclosure.
Figure 2E:
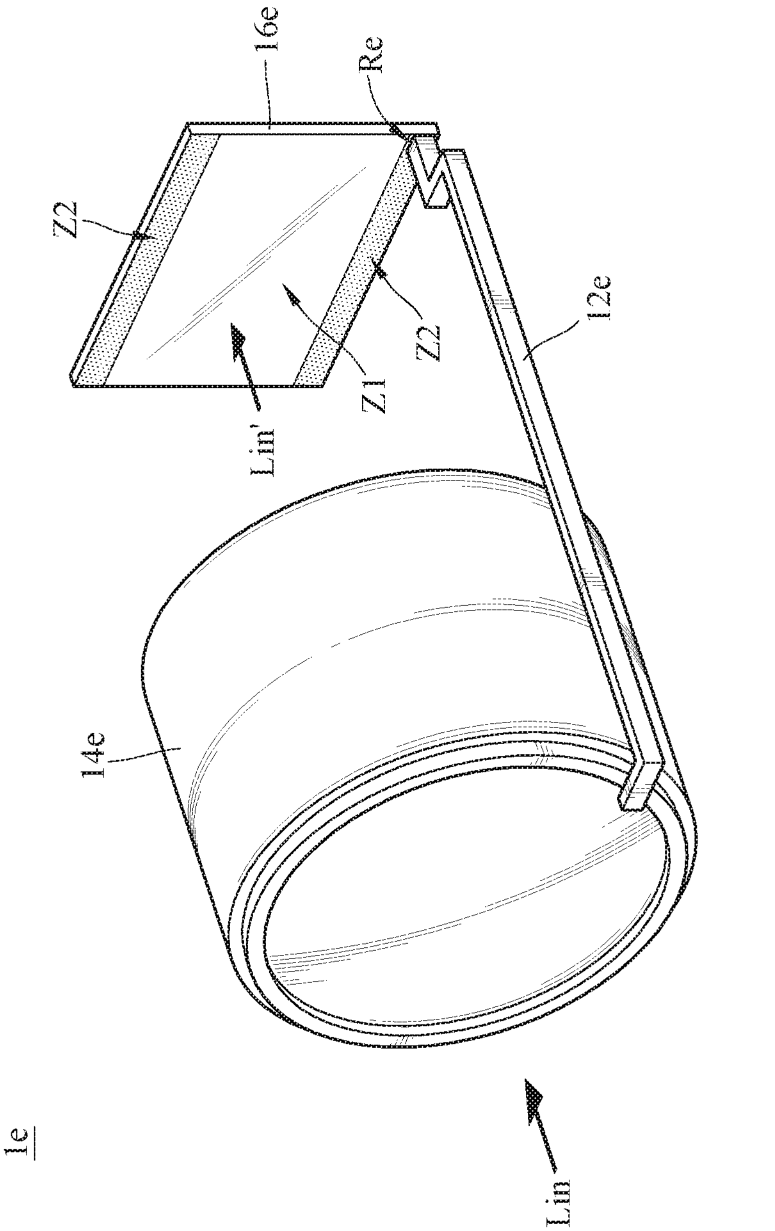
FIG. 2E is a schematic view of the relative location of a fraction of components in the image capturing device according to the fifth embodiment of the disclosure.

As shown in FIG. 2D, the light diffuser 12*d* is located between the image sensor 16*d* and the lens assembly 14*d* and is ring-shaped; and the reference images Rd are located at the corners of the second sensing region Z2.

As shown in FIG. 2E, the light diffuser 12*e* is approximately a long rail, which may have one or more bended parts according to the design of the mechanism in practice. One end of the light diffuser 12*e* is exposed by the case of the image capturing device 1*e* for the absorption of a fraction of the incident light, and the other end of the light diffuser 12*e* extends toward the image sensor 16*e* for guiding the reference light Lref to the image sensor 16*e*. The light diffuser 12*e* may contact the image sensor 16*e* or not contact the image sensor 16*e*. In this embodiment, where the reference image Re is located corresponds to which part of the image sensor 16*e* is directed by the light diffuser 12*e*.

Figure 3A:
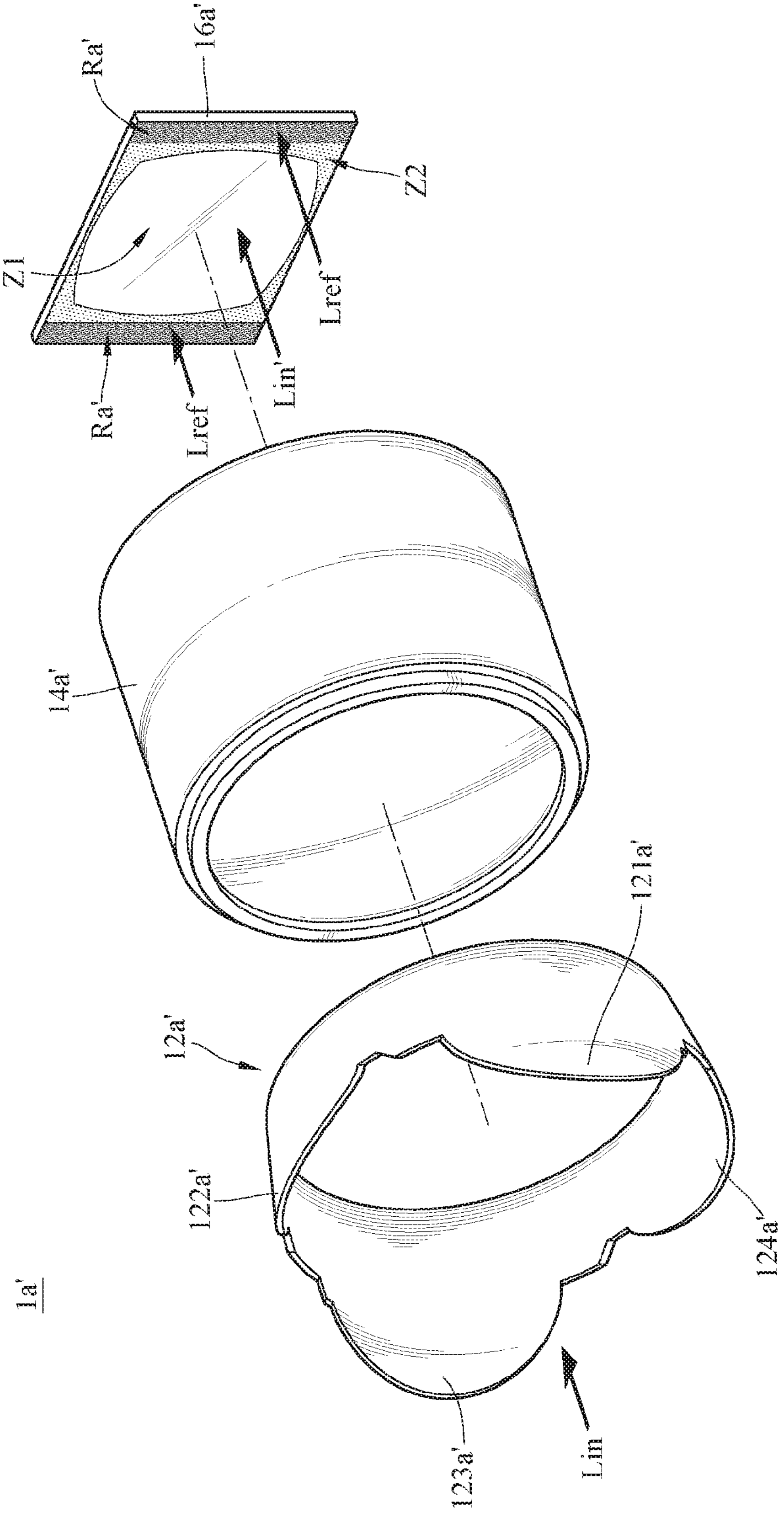
FIG. 3A is a schematic view of the relative location of a fraction of components in the image capturing device according to the sixth embodiment of the disclosure.
Figure 3B:
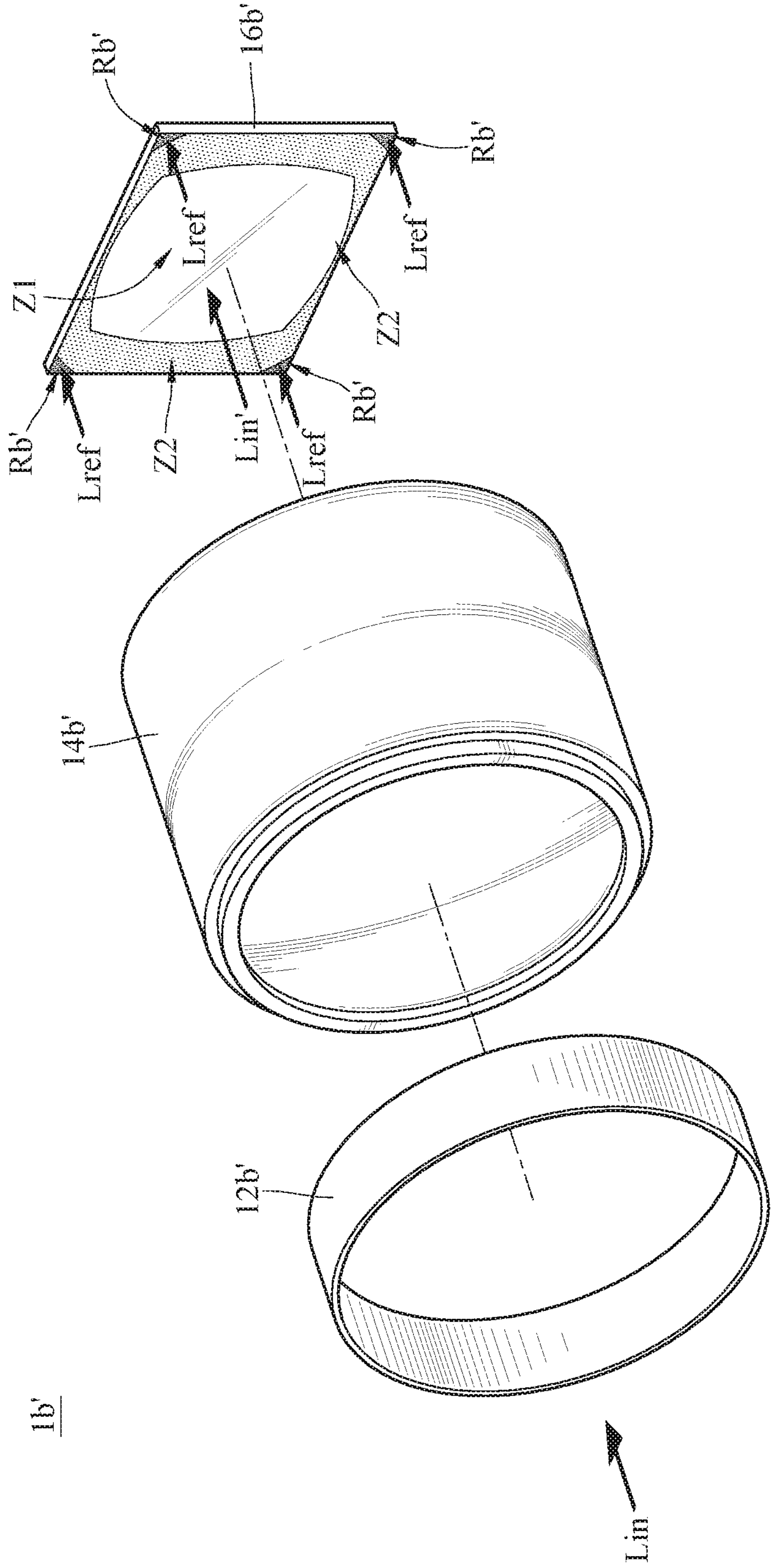
FIG. 3B is a schematic view of the relative location of a fraction of components in the image capturing device according to the seventh embodiment of the disclosure.
Figure 3C:
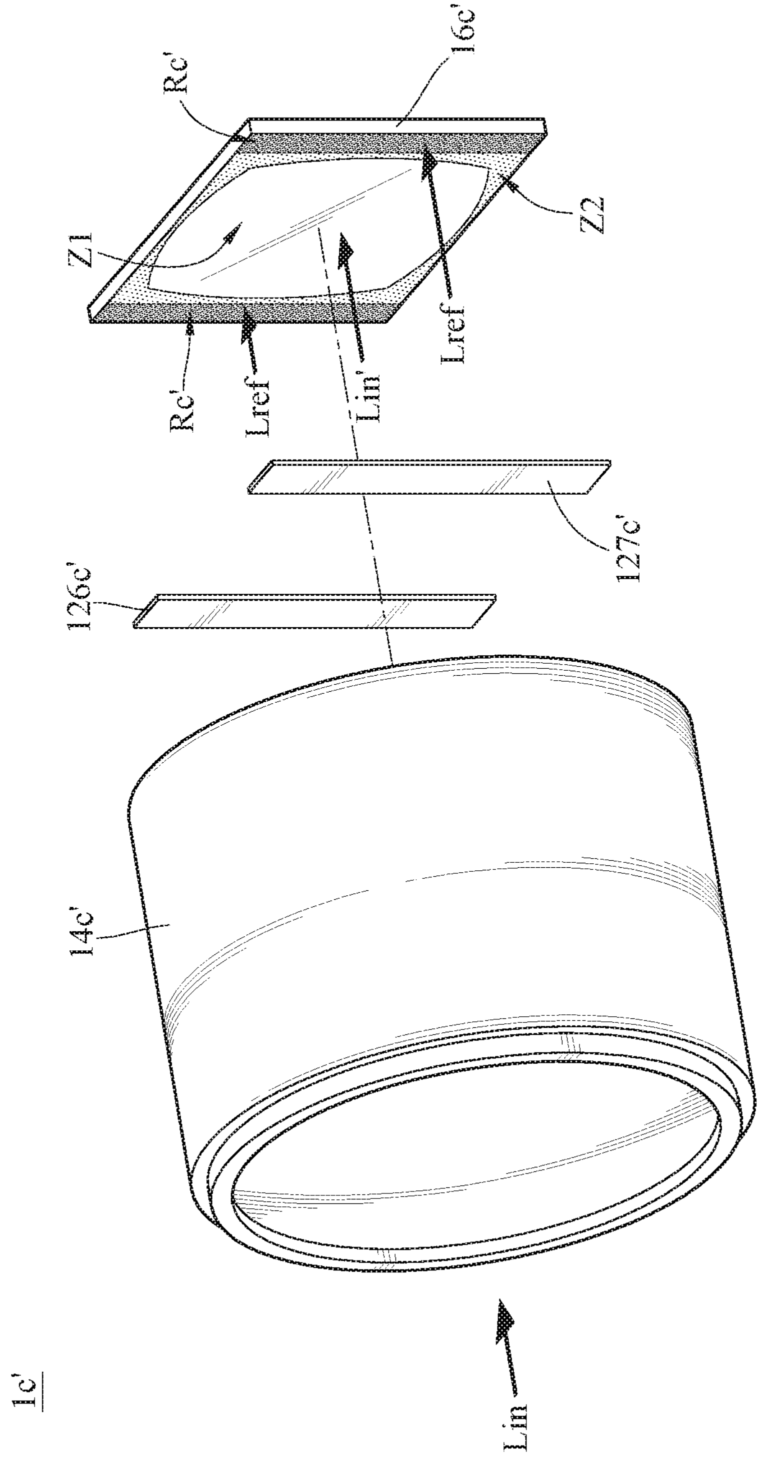
FIG. 3C is a schematic view of the relative location of a fraction of components in the image capturing device according to the eighth embodiment of the disclosure.
Figure 3D:
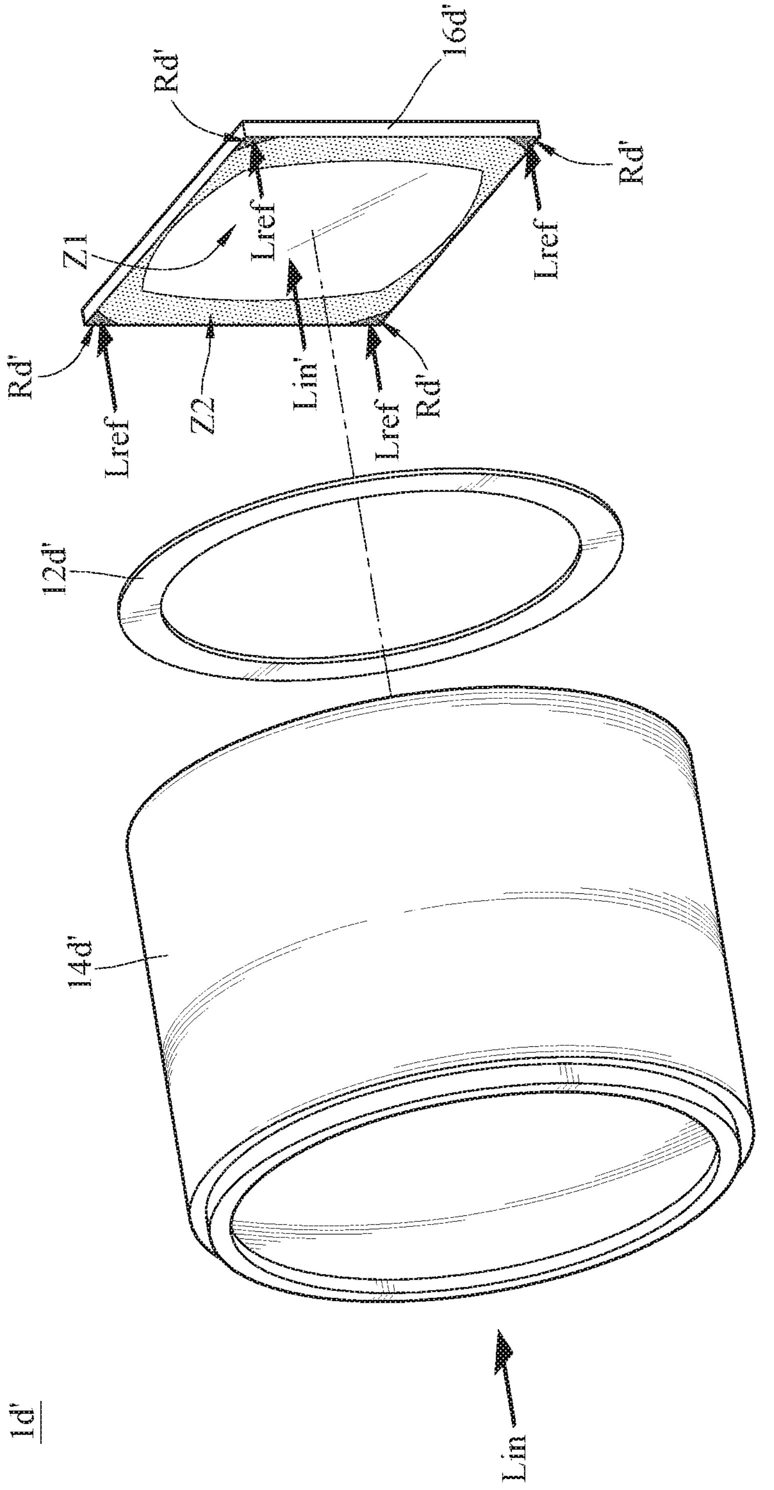
FIG. 3D is a schematic view of the relative location of a fraction of components in the image capturing device according to the ninth embodiment of the disclosure.
Figure 3E:
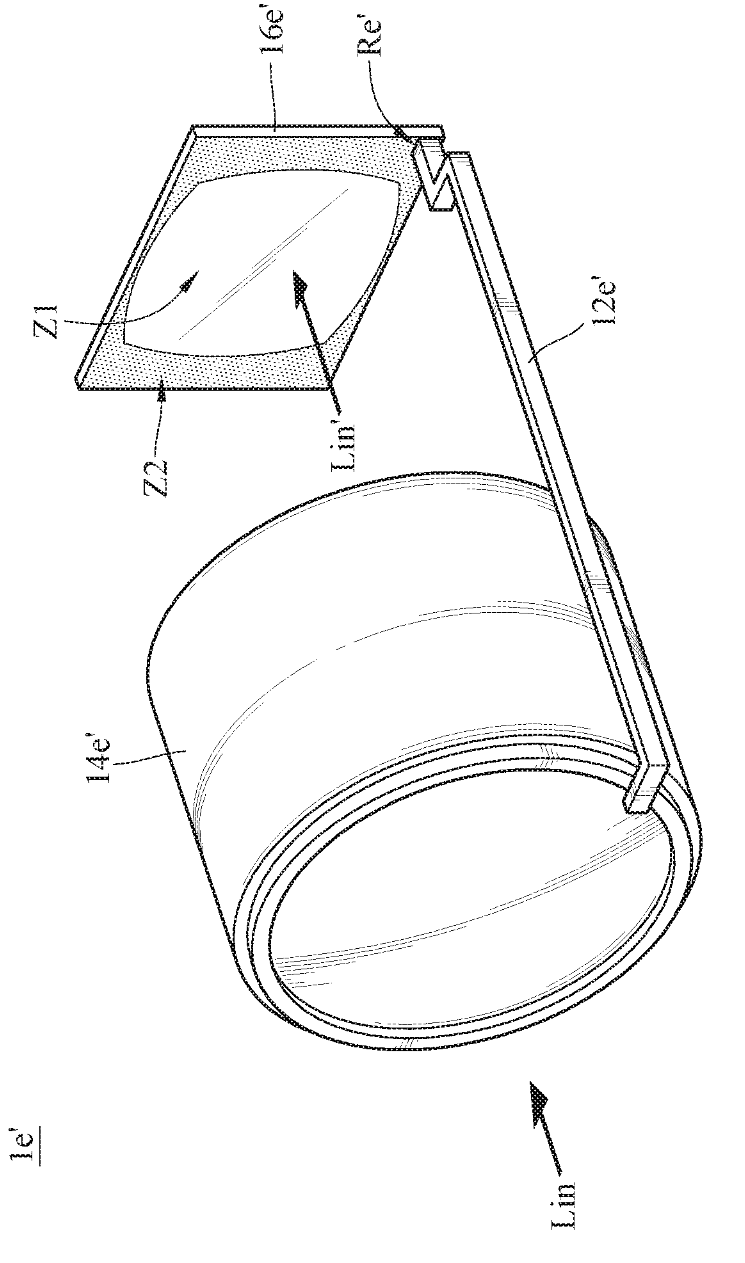
FIG. 3E is a schematic view of the relative location of a fraction of components in the image capturing device according to the tenth embodiment of the disclosure.

Please refer to FIGS. 3A~FIG. 3E to illustrate the image distortion caused by the lens assembly; and FIG. 3A is a schematic view of the relative location of a fraction of components in the image capturing device according to the sixth embodiment of the disclosure, and FIG. 3B is a schematic view of the relative location of a fraction of components in the image capturing device according to the seventh embodiment of the disclosure, FIG. 3C is a schematic view of the relative location of a fraction of components in the image capturing device according to the eighth embodiment of the disclosure, FIG. 3D is a schematic view of the relative location of a fraction of components in the image capturing device according to the ninth embodiment of the disclosure, and FIG. 3E is a schematic view of the relative location of a fraction of components in the image capturing device according to the tenth embodiment of the disclosure. The embodiments shown in FIG. 3A~FIG. 3E are based on a wide-angle lens as a lens assembly.

Basically, the light diffusers 12*a*'~12*e*' shown in FIGS. 3A-3E correspond to the light diffusers 12*a*~12*e* shown in FIGS. 2A~2E, respectively. The difference between the embodiments shown in FIGS. 2A~2E and the embodiments shown in FIGS. 3A~3E is that the area of the first sensing region Z1 occupied by the incident light Lin' and the shape of the area in the embodiments shown in FIG. 3A~FIG. 3E are different from those in the embodiments shown in FIGS. 2A~2E since the lens assemblies 14*a*'~14*e*' in FIGS. 3A~3E are wide-angle lenses, and this different affects the designs of the first sensing region Z1 and the second sensing region Z2. Any person having ordinary skill in the art can understand in view of FIGS. 2A~2E and FIGS. 3A~3E that the designs of the first sensing region Z1 and the second sensing region Z2 are affected by the type of the lens assembly. In an embodiment, the lens assembly and the light diffuser are paired to provide an optical module, that is, the shape of the light diffuser corresponds to that of the lens assembly, so the reference image may be located in the second sensing region. In practice, the light diffuser may be embedded in the lens assembly, so it is convenient to replace the light diffuser together with the lens assembly. The foregoing description is only exemplary, and the disclosure is not limited to the above exemplary embodiments.

After the display image information and the correction information are respectively obtained from the first sensing region Z1 and the second sensing region Z2 of the image sensor 16, the processor 18 adjusts the white balance setting in the display image information according to the correction information. For example, the second sensing region Z2 has M pixels, and the correction information includes the color components Ri, Bi and Gi related to the ith pixel in the second sensing region Z2; and the processor 18 respectively calculates the mean or weighted-mean of at least a part of the color gains Rgi and the mean or weighted-mean of at least a part of the color gains Bgi to obtain reference gain means $\overline{(Rg)}$ref and $\overline{(Bg)}$ref after generating the color gains Rgi and Bgi according to the color components Ri, Gi and Bi, and then, the processor 18 adjusts the white balance setting of a display image according to the color gain correction values Rgain and Bgain after obtaining the color gain correction values Rgain and Bgain according to the reference gain means $\overline{(Rg)}$ref and $\overline{(Bg)}$ref. In this case, the color component Ri indicates red, the color component Bi indicates blue, the color component Gi indicates green, i and M are positive integers, i is not larger than M, the color gain Rgi is a gain of the red component related to the ith pixel in the second sensing region Z2, the color gain Bgi is a gain of the blue component related to the ith pixel in the second sensing region Z2, the reference gain mean ($\overline{Rg}$)ref is the mean or weighted mean of at least a part of the red gains of the M pixels in the second sensing region Z2, and the reference gain mean ($\overline{Bg}$)ref is the mean or weighted mean of at least a part of the blue gains of the M pixels in the second sensing region Z2.

The color gain Rgi is, for example, not limited to be expressed as:

$$Rgi = \frac{Ri}{Gi}.$$

The color gain Bgi is, for example, not limited to be expressed as:

$$Bgi = \frac{Bi}{Gi}.$$

In practice, the color gains Rgi and Bgi may be defined in other ways, and any person having ordinary skill in the art can design them according to actual requirements. Moreover, any person having ordinary skill in the art can freely design how to use the color gain correction values Rgain and Bgain to adjust the white balance setting of display images, and the disclosure has no limitation thereon. The follow-up description will exemplarily be based on the reference gain mean $\overline{Rg}$ as an average of the red gains of the M pixels and the reference gain mean $\overline{Bg}$ as an average of the blue gains of the M pixels.

More particularly, in an embodiment, the processor 18 acquires the color gain correction values Rgain and Bgain from a lookup table according to the reference gain means ($\overline{Rg}$)ref and ($\overline{Bg}$)ref, respectively. The lookup table is listed below:

| Color temperature | Predetermined gain mean ($\overline{Rg}$)pre | Predetermined gain mean ($\overline{Bg}$)pre | Standard gain correction value Rstd | Standard gain correction value Bstd |
|---|---|---|---|---|
| 2900 K | 0.79 | 2.20 | 0.86 | 2.26 |
| 4000 K | 1.05 | 1.84 | 1.15 | 1.95 |
| 5290 K | 1.24 | 1.58 | 1.35 | 1.59 |
| 6300 K | 1.40 | 1.44 | 1.52 | 1.54 |

Such an exemplary lookup table presents the predetermined gain means ($\overline{Rg}$)pre and ($\overline{Bg}$)pre and the standard gain correction values Rstd and Bstd under a different color temperature. Each of the predetermined gain means ($\overline{Rg}$)pre corresponds to one of the standard gain correction values Rstd, and each of the predetermined gain means ($\overline{Bg}$)pre corresponds to one of the standard gain correction values Bstd. The processor 18 searches for the predetermined gain mean ($\overline{Rg}$)pre, which is substantially equal to the current reference gain mean $\overline{Rg}$ or the closest to the reference gain mean ($\overline{Rg}$)ref, and the predetermined gain mean ($\overline{Bg}$)pre, which is substantially equal to the current reference gain mean $\overline{Bg}$ or the closest to the reference gain mean ($\overline{Bg}$)ref, in the lookup table. Next, the processor 18 defines the standard gain correction value Rstd, corresponding to the found predetermined gain mean ($\overline{Rg}$)pre, to be the color gain correction value Rgain and defines the standard gain correction value Bstd, corresponding to the found predetermined gain mean ($\overline{Bg}$)pre, to be the color gain correction value Bgain. Finally, the processor 18 uses the color gain correction values Rgain and Bgain to adjust the white balance setting of display images. When no predetermined gain mean ($\overline{Rg}$)pre as the same as the reference gain mean $\overline{Rg}$ and/or no predetermined gain mean ($\overline{Bg}$)pre as the same as the reference gain mean $\overline{Bg}$ is found in the lookup table, an interpolation manner or an extrapolation manner may be performed to the predetermined gain means ($\overline{Rg}$)pre and ($\overline{Bg}$)pre and the standard gain correction values Rstd and Bstd under different color temperatures, so as to obtain a set of approximations as the color gain correction values Rgain and Bgain. A person having ordinary skill in the art can freely design the relevant calculation, and the disclosure has no limitation thereon.

Furthermore, the predetermined gain means ($\overline{Rg}$)pre and ($\overline{Bg}$)pre and the standard gain correction values Rstd and Bstd may be obtained experimentally in advance. When the image capturing device 1 is photographing an image, the second sensing region Z2 converts the reference light Lref to the correction information, and the reference gain means ($\overline{Rg}$)pre and ($\overline{Bg}$)pre are respectively generated based on the color components Ri, Gi and Bi in the correction information. Conceptually, the predetermined gain means ($\overline{Rg}$)pre and ($\overline{Bg}$)pre are reference gain means generated by the color components of the correction information under different color temperatures. The standard gain correction values Rstd and Bstd are color gain means obtained by capturing a standard grayscale picture under different color temperatures, and are ideally standard color gain mean under different color temperatures, and the disclosure is not limited to the model of the standard grayscale picture. The foregoing description is only for explaining the physical meanings of the above parameters by the operation of the image capturing device 1, but such a description is not limited to the experimentations for obtaining the above parameters.

Figure 4:
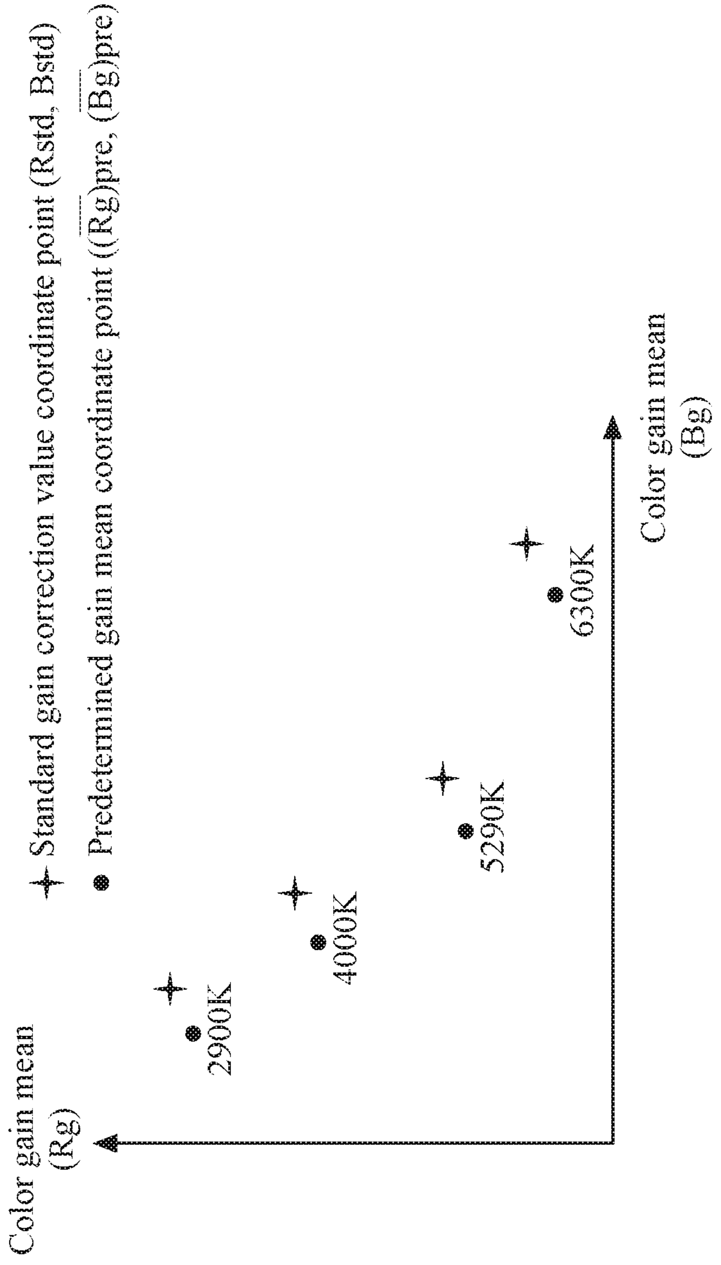
FIG. 4 is a schematic diagram of a color coordinate distribution according to an embodiment of the disclosure.

Please refer to FIG. 4 to illustrate another method of obtaining the color gain correction values Rgain and Bgain; and FIG. 4 is a schematic diagram of a color coordinate distribution according to an embodiment of the disclosure. As shown in FIG. 4, the horizontal axis represents the color gain mean Rg, the vertical axis represents the color gain mean Bg, and a coordinate point having a different shape represents a standard gain correction value coordinate (Rstd, Bstd) or a predetermined gain mean coordinate (($\overline{Rg}$)pre, ($\overline{Bg}$)pre) in FIG. 4, which corresponds to the standard gain correction values Rstd and Bstd or the predetermined gain means ($\overline{Rg}$)pre and ($\overline{Bg}$)pre under a different color temperature.

If the standard gain correction value coordinate point and the predetermined gain mean coordinate point under the same color temperature have an offset vector therebetween, a different standard gain correction value coordinate point (Rstd, Bstd) is estimated according to a different predetermined gain mean coordinate point (($\overline{Rg}$)pre, ($\overline{Bg}$)pre) in a different offset vector under the relative color temperature. As shown in FIG. 4, the offset vectors have a non-obvious difference therebetween under each color temperature. Therefore, in an embodiment, a mean or weighted mean of these offset vectors may be set as an average offset vector, which is used for transforming the measured reference gain means ($\overline{Rg}$)ref and ($\overline{Bg}$)ref to the color gain correction values Rgain' and Bgain'.

In an exemplary embodiment, the standard gain correction values Rstd and Bstd and the predetermined gain means $(\overline{Rg})$pre and $(\overline{Bg})$pre are measured under N experimental color temperatures, a ratio between the standard gain correction value $(\overline{Rg})$pre and the predetermined gain mean Rstd under the jth experimental color temperature is set as a standard gain ratio rRj, a ratio between the standard gain correction value $(\overline{Bg})$pre and the predetermined gain mean Bstd under a different color temperature is set as a standard gain ratio bRj, N and j are positive integers, and j is not larger than N. Then, a mean or weighted mean of all standard gain ratios rRj is set as the color gain ratio $\overline{rR}$, and a mean or weighted mean of all standard gain ratios bRj is set as the color gain ratio $\overline{bR}$. In an embodiment, the color gain ratios $\overline{rR}$ and $\overline{bR}$ are default values stored in the storage of the image capturing device 1, but the disclosure is not limited thereto. In practice, the processor 18 obtains the color gain correction value Rgain' that is the product of the obtained reference gain mean $(\overline{Rg})$ref and the color gain ratio $\overline{rR}$, and obtains the color gain correction value Bgain' that is the product of the obtained reference gain mean $(\overline{Bg})$ref and the color gain ratio $\overline{bR}$, to correct the white balance setting of a display image according to the color gain correction values Rgain' and Bgain'.

Figure 5:
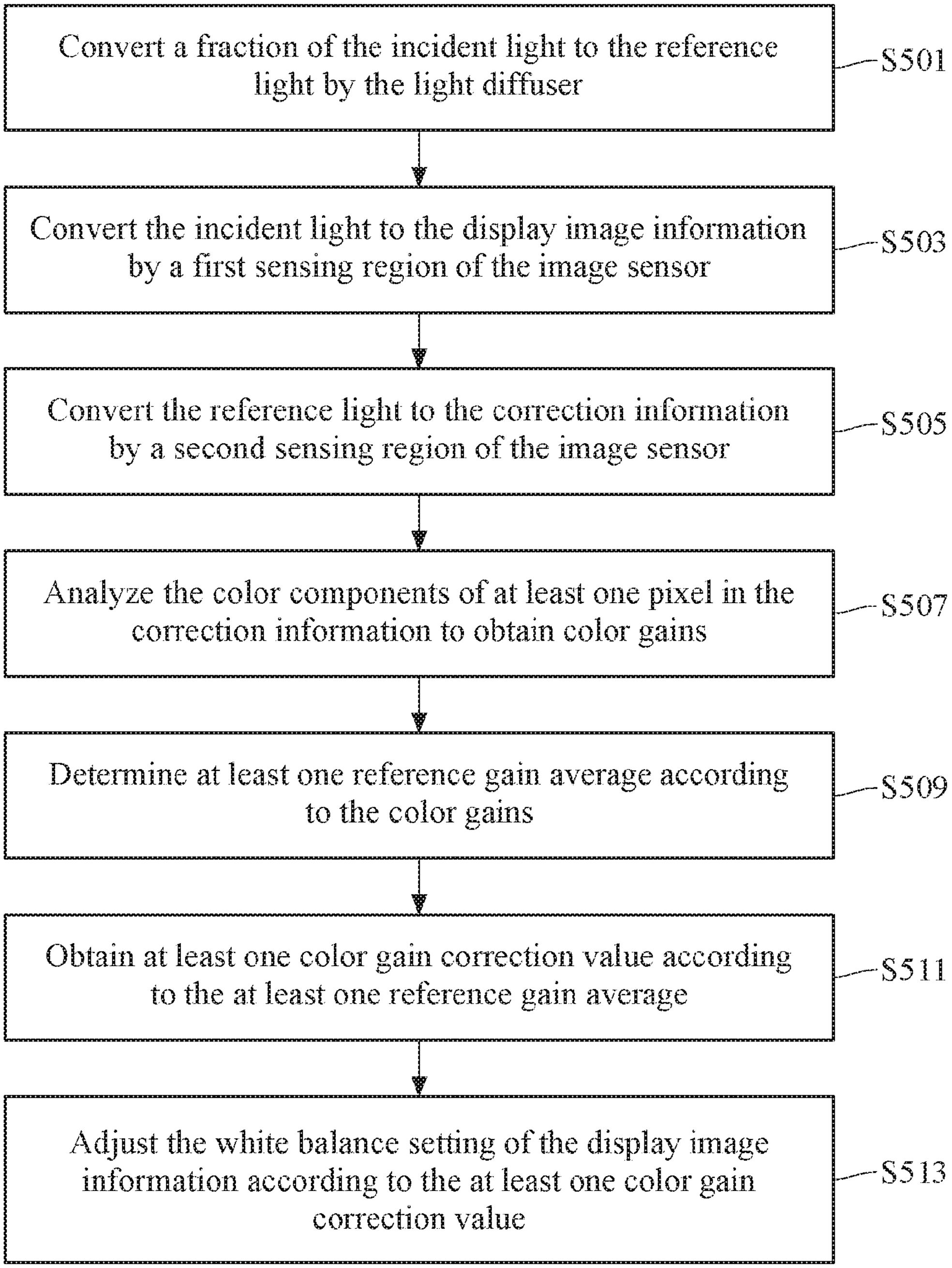
FIG. 5 is a flow chart of an automatic white balance correction method according to an embodiment of the disclosure.

Please refer to FIG. 5, which is a flow chart of an automatic white balance correction method according to an embodiment of the disclosure. First, in step S501, a light diffuser is used to convert a fraction of the incident light to the reference light. Then, in step S503, a first sensing region of an image sensor is used to convert the incident light to the display image information. In step S505, a second sensing region of the image sensor is used to convert the reference light to the correction information. In step S507, a plurality of color gains is obtained by analyzing the color components related to at least one pixel in the correction information. In step S509, at least one reference gain average is determined according to the color gains. In step S511, at least one color gain correction value is obtained according to the at least one reference gain average. In step S513, the white balance setting of the display image information is adjusted according to the at least one color gain correction value.

In summary, the disclosure provides an image capturing device having automatic white balance, and an automatic white balance correction method. The disclosure employs a first sensing region of an image sensor to obtain the display image information as employing a second sensing region of the image sensor to obtain the correction information related to one or more diffuser sheets. The designs of the first and second sensing regions are affected by the type of the lens assembly. Also, the relevant information of the current color temperature or the information about the correction of the white balance setting is determined according to the correction information to correct the white balance information of display images.

In an embodiment, the relevant information for correcting the white balance setting is found in a lookup table according to the correction information, so the white balance setting may more accurately be corrected by more data. In another embodiment, the relevant information for correcting the white balance setting is obtained according to the correction information and at least one color gain ratio, so a great deal of computing processes and more storage space may be saved.

Accordingly, the disclosure may occupy a relatively low quantity of computing resources and not interfere with photographing. Also, since the light forming the correction information and the light forming the display image information approximately propagate to an image sensor along the same optical path or extremely-near optical paths, the correction information and the display image information have extremely similar light source properties therebetween. Therefore, the disclosure may achieve more intuitional and accurate white balance correction.

What is claimed is:

1. An image capturing device having an automatic white balance, comprising:
- a lens assembly;
- a light diffuser configured to convert a fraction of incident light to reference light, and relative location of the light diffuser and the lens assembly being fixed;
- an image sensor comprising a first sensing region and a second sensing region and configured to convert the incident light to display image information via the first sensing region and convert the reference light to correction information via the second sensing region; and
- a processor electrically connected to the image sensor and configured to analyze color components related to at least one pixel in the correction information to obtain a plurality of color gains, determine at least one reference gain average according to the color gains, obtain at least one color gain correction value according to the at least one reference gain average, and adjust white balance setting of the display image information according to the at least one color gain correction value;
- wherein the processor acquires the at least one color gain correction value from a lookup table recording a plurality of standard gain correction values and a plurality of predetermined gain means, each of the standard gain correction value corresponds to one of the predetermined gain means, and at least one of the standard gain correction values, which corresponds to at least one of the predetermined gain means, which is the closest to the at least one reference gain average, is defined as the at least one color gain correction value, and the predetermined gain means correspond to different color temperatures, respectively.

2. The image capturing device according to claim 1, wherein the light diffuser is located between the lens assembly and a scene, the incident light is related to the scene, and the light diffuser, the lens assembly and the image sensor together form an optical path, in which the incident light propagates to the image sensor after propagating to the light diffuser and further the lens assembly.

3. The image capturing device according to claim 1, wherein the light diffuser is located between the lens assembly and the image sensor, the incident light is related to a scene, and the light diffuser, the lens assembly and the image sensor together form an optical path, in which the incident light propagates to the image sensor after propagating to the lens assembly and further the light diffuser.

4. The image capturing device according to claim 1, wherein a first side of the light diffuser is exposed at the outside of the image capturing device, a second side of the light diffuser faces the second sensing region of the image sensor, the light diffuser guides the reference light from the first side to the second side and then guides the reference light to the second sensing region.

5. An automatic white balance correction method applied to an image capturing device that comprises a lens assembly, a light diffuser and an image sensor, relative location of the light diffuser and the lens assembly being fixed, and the automatic white balance correction method comprising:

converting a fraction of incident light to reference light by the light diffuser;

converting the incident light to display image information by a first sensing region of the image sensor;

converting the reference light to correction information by a second sensing region of the image sensor;

analyzing color components related to at least one pixel in the correction information to obtain a plurality of color gains;

determining at least one reference gain average according to the color gains;

obtaining at least one color gain correction value according to the at least one reference gain average; and adjusting white balance setting of the display image information according to the at least one color gain correction value;

wherein determining the at least one reference gain average according to the color gains comprises:

searching for the at least one color gain correction value in a lookup table recording a plurality of standard gain correction values and a plurality of predetermined gain means; and defining at least one of the standard gain correction value, which corresponds to at least one of the predetermined gain means, which is the closest to the at least one reference gain average, to be the at least one color gain correction value;

wherein each of the standard gain correction values corresponds to one of the predetermined gain means, and the predetermined gain means respectively correspond to different color temperatures.

* * * * *